United States Patent [19]

Hennion et al.

[11] 4,259,296
[45] Mar. 31, 1981

[54] RECOVERY OF CHROMIUM FROM SCRAP

[75] Inventors: Francis J. Hennion, Sussex, N.J.; John J. deBarbadillo, Warwick; Umar M. U. Ahmad, Wappingers Falls, both of N.Y.

[73] Assignee: The United States of America as represented by the Secretary of the Interior, Washington, D.C.

[21] Appl. No.: 108,192

[22] Filed: Dec. 27, 1979

[51] Int. Cl.$^3$ ............................................. C01G 37/00
[52] U.S. Cl. .................................. 423/53; 423/561 R
[58] Field of Search .............................. 423/561 R, 53

[56] References Cited

U.S. PATENT DOCUMENTS 3,577,231   5/1971   Pesses ................................. 423/561

*Primary Examiner*—M. J. Andrews
*Attorney, Agent, or Firm*—William S. Brown; Donald A. Gardiner

[57] ABSTRACT

To recover chromium from scrap such as superalloy scrap, the feedstock is melted, subjected to controlled oxidation to oxidize and slag off reactive metals, then subjected to sulfidation and slow cooling to produce a coarse-grained solid wherein the bulk of the chromium is present in a phase consisting predominantly of a chromium sulfide.

10 Claims, No Drawings

RECOVERY OF CHROMIUM FROM SCRAP

BACKGROUND OF THE INVENTION

Chromium is an important constituent of a wide variety of alloys, including various steels as well as nickel-based, cobalt-based, and copper-based alloys. Chromite ore from which the metal is derived is found in abundance in relatively few places, notably in southern Africa, whereas large amounts of chromium-containing scrap are generated in most industrialized countries and recovery of the chromium therefrom is highly desirable.

The recycling of chromium-containing scrap metal does not pose any insurmountable difficulties in the case of stainless steel production. This is due in part to the ability to refine in the melting vessel as in the case of the AOD process. However, the same is not true in the case of production of many complex alloys which may contain five or even ten alloying elements. Such alloys are often very sensitive to contamination, and are produced by processes which do not lend themselves to any extensive refining in the melting vessel. As a result, producers of complex alloys, such as the so-called superalloys, tend to rely on pure metals for their feed, while chromium-containing scrap is downgraded to produce less demanding alloys.

While procedures have been proposed in the past for separating the alloy constituents of scrap metals, none of the procedures to our knowledge has ever reached the stage of commercial implementation. This is undoubtedly ascribable to the cost and complexity of such procedures. Thus, methods of treating superalloy scrap are described in U.S. Pat. No. 3,544,309 (to A. W. Fletcher et al) as well as in the publication by P. T. Brooks et al entitled "Chemical Reclaiming of Superalloy Scrap," U.S. Department of the Interior, Bureau of Mines, 1969. The methods are directed primarily at recovering nickel and cobalt from the scrap and entail a complete dissolution of the scrap, after which the various metals are separated by hydrometallurgical steps.

A process which avoids the slow and indiscriminate procedure of putting the whole of the scrap into solution is described in a published Japanese patent application, No. 73-44121 by T. Goto. The process described therein involves an initial pyrometallurgical treatment in which superalloy scrap is melted and blown with oxygen until such metals as aluminum, titanium, and silicon as well as much of the chromium content of the melt have been oxidized. Sulfur is then added and the bath is reblown to remove iron and chromium. The result is that iron and chromium are removed together in a slag high in titanium, aluminum, and silicon, while a matte said to contain 60.8% Ni, 14.2% Co, 0.4% Cu, and 24.5% S is derived after the blowing. The separate recovery of chromium or iron from the resulting slag is unlikely to be economically feasible.

Also worthy of mention in the present context in U.S. Patent No. 3,313,601 (to O. F. Marvin) despite the fact that it does not relate to the treatment of scrap. The Marvin patent is concerned with the treatment of complex oxide ores, and describes an example wherein a chromite ore concentrate is heated to about 870° C. in the presence of CS gas whereby it is said to be converted to a mixture of chromium sulfide, iron sulfide, and iron oxide. The cooled mass is subsequently leached to leave a residue of chromium sulfide. The outcome of attempting such a solid state sulfidation on alloy scrap is unknown, and the subsequent hydrometallurgical separation process would be much more complex in a multi-component system.

OBJECT OF THE INVENTION

The present invention aims at providing a method by which chromium can be separated, conveniently and inexpensively, from other constituents of scrap metals.

SUMMARY OF THE INVENTION

According to the invention, a process for separating chromium from other constituents of a scrap metal charge, which contains chromium alloyed with at least one metal selected from the group consisting of nickel, cobalt and copper, and may contain lesser amounts of other metals, comprises:

(i) heating said charge to form a melt thereof;

(ii) introducing into said melt an oxidant selected from the group consisting of oxygen, oxygen-containing gaseous mixtures and reducible metal oxides (such as NiO), in a predetermined amount effective to oxidize any reactive metals of the group consisting of: aluminum, titanium, silicon, calcium, magnesium, zirconium, hafnium, tantalum, and manganese which are present in said melt, and adding fluxing reagent to said melt to form a molten slag containing oxides of said reactive metals;

(iii) separating said slag from the resulting partly refined melt;

(iv) introducing into said partly refined melt a sulfiding agent selected from the group consisting of elemental sulfur and metal sulfides, in a predetermined amount effective to ensure sulfidation of substantially all of the chromium present in said melt;

(v) slow-cooling the sulfided metal at a controlled rate effective to ensure the formation of a coarse-grained matte which consists predominantly of a chromium sulfide;

(vi) fragmenting said cooled matte to an extent sufficient to liberate the individual phases thereof; and (vii) subjecting said fragmented matte to at least one physical separation process to separate chromium sulfide particles from the remainder of said matte.

It is essential to success of the process of the invention that the scrap charge be transformed into a molten matte in which substantially all of the chromium is sulfided, and that the molten matte be cooled at a rate slow enough to produce a coarse-grained solid wherein chromium sulfide is present as an individual phase which can be liberated by fragmenting the solid. The technique of sulfidation followed by slow-cooling is a well known and commercially practiced way of separating nickel from copper. To our knowledge, however, there are no reported studies of the effect of slow cooling chromium-containing mattes. We have found, surprisingly, that where a matte contains chromium as well as nickel, cobalt and iron, for example, slow cooling can produce a structure in which the major part of the chromium is present in individual grains which contain little of the other matte constituents.

The sulfur content of the matte formed is important in that it must be at least sufficient to ensure that all of the chromium is sulfided. In practice, this means the addition of more than twice the stoichiometric amount of sulfur needed to combine with the chromium since we have observed that in the initial stages of sulfidation, formation of chromium sulfide is accompanied by formation of nickel or cobalt sulfide at roughly the same rate. It is by no means necessary to sulfide all of the scrap constituents other than chromium. Indeed we have found it preferable to adjust the sulfur content so that the matte produced is sulfur deficient. Accordingly, we prefer to adjust the sulfur content to less than about 30%, and preferably to a value within the range of about 20-30%. (Unless otherwise specified, all percentages quoted herein are percentages by weight). A sulfur level of at least about 20% also contributes good grindability to the slow-cooled matte.

Where the matte produced is not saturated with sulfur, but instead is sulfur deficient, its cooling will produce a structure consisting of two or more sulfide phases as well as a metallic phase. We have found that in such a case, very little chromium reports to the metallic phase, which is generally easy to separate from the sulfide phases, e.g., magnetically where the metallic phase is rich in iron, nickel or cobalt.

Introduction of sulfur into the melt may comprise adding elemental sulfur, or alternatively sulfides of metals which are not undesirable in the melt can be used. The use of nickel sulfide, cobalt sulfide or copper sulfide, alone or in combination with elemental sulfur, is a particularly useful way of recycling a product of the separation process. Iron sulfide may be used to a limited extent only in view of the necessity of restricting the iron level of the matte.

Reactive metals such Al, Si and Ti would, if present during the sulfiding stage, react with the sulfur in preference to chromium or nickel. This would necessitate introduction of a greater amount of sulfur into the melt to ensure sulfiding of the chromium. Moreover, the sulfides formed by these reactive metals might contaminate the chromium-containing phase to be produced. Accordingly, it is important to remove the reactive metals by oxidation and slagging. The oxidation is most conveniently carried out by blowing air or oxygen into the melt. Chromite ore and oxidic ores of valuable metals such as niobium may also be used with the incidental benefit of overall improved metal recovery. Oxidic compounds of iron, nickel, cobalt, copper, chromium, niobium and molybdenum may be employed as reducible metal oxides. Solid oxidants, including various oxidized metallic wastes and ores may be used instead of oxygen. Nickel oxide is particularly useful as an oxidant. The metallic oxidant must be reducible by the reactive metal (e.g. aluminum) or metals to be removed and, furthermore, contamination of the melt by undesirable metals should be avoided. A particular group of undesirable contaminants comprises the so-called white metals, i.e., Pb, Bi, Sn, Sb, etc. These elements generally have adverse effects on many alloys in which the recovered metals may be used, and are not eliminated by the refining involved in the process of the invention. As a result, if such impurities are present in the feedstock they will report in one of the phases of the slow-cooled matte. It is, therefore, desirable to limit the amount of such impurities which may be present in the feedstock.

The process of the invention may be practiced on a wide variety of feedstocks, providing the melt temperature and amounts of oxidant and sulfiding agents are selected appropriately for the particular charge. Large amounts of iron in the feed necessitate the use of excessively high temperatures to melt the charge and are hence to be avoided. Thus, scrap which is iron based, such as stainless steel, can be treated in combination with low-iron scrap to dilute the iron content of the mix as a whole. In general, we have found it convenient to operate with a melt temperature in the range of about 1250°-1600° C. depending on the composition of the charge. Generally, the iron content of the melt should not exceed about 20%, preferably not more than about 10%. The chromium content of the initial melt should be at least about 5% and may be up to about 50%.

The melting of the charge and its refining by oxidation and sulfiding can be performed in a single externally heated refractory-lined vessel. A high frequency coreless induction furnace is suitable for this pyrometallurgical treatment and we have used such a vessel in our experiment work. However, the treatment could also be performed in any of the well known tiltable gas-fired or electric furnaces. If a gaseous oxidant is used it may be blown into the melt by means of a lance or through appropriate tuyeres. Solid oxidant can be added to, or blown into, the melt. Similarly, the elemental sulfur or metal sulfide added at a later stage may be added manually or pneumatically. A fluxing agent is needed to provide a fluid slag containing the oxidized reactive metals and the vessel must be designed to facilitate removal of the slag by tapping or skimming.

Slow cooling is needed to produce the coarse grained structures suitable for subsequent separation of the phases. Cooling rates similar to those used in the matte separation process for Cu-Ni separation have been found satisfactory in the process of the present invention. Such rates are of the order of magnitude of 7° C. per hour for three days or so, after which the ingot can be allowed to cool at a somewhat faster rate. To achieve the slow cooling the molten matte can be poured into large molds which are provided with insulated covers.

Fragmenting the matte preferably entails its comminution to particles no greater than about 0.15 mm and preferably no greater than 75 microns in diameter, i.e. minus 200 mesh (Tyler). It can be performed by coarse crushing on a roll crusher followed by fine grinding in a combination of magnetic separation and flotation. However, other techniques making use of the differences in densities or electromagnetic properties of the particles may be resorted to.

Some examples of the process will be described.

EXAMPLE 1

Several melts were prepared using in each case a mixture of metallic ingredients intended to simulate a scrap metal charge. Each charge, weighing about 12 kg, was heated to about 1560° C. and a mixture of flourspar and lime was added for fluxing purposes. The resulting melt was thereafter oxidized in one of the following ways. In a first test (A) gaseous oxidant was used in the form of an argon-oxygen mixture (75% oxygen) which was blown into the melt at the rate of 14 liters per minute for 10 minutes. In a second test (B) chromite ore was used as oxidant, 0.744 kg of the ore being added to the melt which was then held at temperature for 15 minutes. In a third test (C) the oxidant used was nickel oxide, 0.8 kg being added to the melt which was held at temperature for 15 minutes thereafter. In yet another test (D) nickel oxide was used once again in the same amount as in the preceding test, except that in this case an argon cover was maintained over the melt. After each test the oxide-containing slag was separated from the partly-refined melt and the latter analyzed. Table 1 below shows the analysis (in %) of each feed melt and its respective partly-refined melt.

As shown by the results, the various techniques of oxidation showed differences in their effectiveness for removing the reactive metals from the melts. The Al and Ti levels were lowered satisfactorily in all of the tests. The Si and Mn levels were lowered only when nickel oxide was used as the oxidant, while in the case of Ta better removal was achieved with the solid oxidants than with the gaseous mixture. Comparison of the results obtained in tests C and C show that in the absence of the argon cover, oxygen in the atmosphere above the melt contributed to the refining achieved.

substantially all of the chromium was present in the chromium sulfide grains.

EXAMPLE 3

A sulfidation test similar to that of Example 2 was carried out on a similar oxidized melt, except that in this case the amount of sulfiding agent was selected to give a matte more sulfur deficient than that of the previous example. A sample of the matte produced in this case was found by chemical analysis to contain:

Ni: 58.6%

TABLE 1

| Test | Oxidant Used | Melt | Ni | Cr | Fe | Co | Mo | W | Nb | Ta | Al | Ti | Si | Mn |
|---|---|---|---|---|---|---|---|---|---|---|---|---|---|---|
| A | Argon-Oxygen Mixture | Initial | 57.71 | 14.5 | 5.5 | 10.0 | 4.6 | 2.0 | 1.5 | 1.7 | 0.90 | 0.97 | 0.32 | 0.22 |
|  |  | Refined | 58.19 | 14.9 | 6.1 | 10.4 | 4.7 | 1.9 | 1.4 | 1.3 | 0.12 | 0.21 | 0.49 | 0.21 |
| B | Chromite Ore | Initial | 59.22 | 14.6 | 4.7 | 10.0 | 4.6 | 1.9 | 1.4 | 1.4 | 0.92 | 0.76 | 0.28 | 0.16 |
|  |  | Refined | 60.11 | 15.9 | 5.4 | 10.1 | 4.6 | 1.8 | 1.3 | <0.1 | 0.02 | 0.04 | 0.42 | 0.16 |
| C | Nickel Oxide | Initial | 59.11 | 14.5 | 4.5 | 9.9 | 4.5 | 2.1 | 1.4 | 1.7 | 0.8 | 0.85 | 0.32 | 0.19 |
|  |  | Refined | 62.24 | 14.3 | 4.8 | 10.3 | 4.5 | 1.8 | 1.2 | 0.4 | <0.05 | 0.02 | 0.20 | 0.12 |
| D | Nickel Oxide (with argon cover) | Initial | 58.57 | 14.9 | 4.8 | 10.2 | 4.7 | 1.4 | 1.4 | 1.5 | 1.17 | 0.82 | 0.30 | 0.15 |
|  |  | Refined | 61.04 | 14.7 | 4.9 | 10.2 | 4.6 | 1.7 | 1.3 | 0.8 | 0.18 | 0.03 | 0.34 | 0.12 |

EXAMPLE 2

The partly refined melt obtained in test B of Example 1 was sulfided in the following manner. To 6 kg of the melt, maintained at about 1560° C., 1.875 kg of nickel sulfide was added in lump form. Power was turned off and the furnace temperature allowed to drop naturally. 1.5 kg of elemental sulfur, in the form of briquettes, was then added to the melt which was then sampled and found to analyze:

Ni: 53.4%
Cr: 10.1%
Fe: 3.4%
Co: 6.4%
Mo: 2.9%
W: 1.1%
Nb: 0.8%
Ta: 0.1%
S: 24.5%

The matte was then slow cooled at the rate of about 130° C. per hour, and thereafter sectioned and examined by electron beam micro-probe analysis. The coarse-grained structure consisted of four distinct phases, probe analyses of which revealed them to be essentially a chromium sulfide phase, a nickel sulfide phase, a heavy metal sulfide phase and a metallic phase. Table 2 shows the analysis of each phase, though it should be pointed out that such probe analyses are generally trustworthy only where the concentration of a given element exceeds 1% or so.

TABLE 2

| Phase | Chromium Sulfide | Nickel Sulfide | Heavy Metal Sulfide | Metallic |
|---|---|---|---|---|
| % Cr | 40 | 0.1 | 3 | 0.06 |
| % Ni | 8 | 66 | 5 | 74.5 |
| % Co | 4 | 4.5 | 2.5 | 14 |
| % Fe | 1 | — | 0.8 | 8.5 |
| % Mo | 1 | — | 17.3 | 1 |
| % S | 46 | 23 | 37.5 | 0.5 |
| % Nb | — | — | 23.5 | — |
| % W | — | — | 12 | — |

The heavy metal phase was present in smaller quantities than any of the other sulfide phases; as a result Cr: 10.2%
Fe: 3.3%
Co: 7.0%
Mo: 3.1%
W: 1.3%
Nb: 0.9%
Ta: 0.2%
S: 14.7%

After slow cooling as in the preceding example, the structure revealed only three phases which were found to be primarily chromium sulfide, nickel sulfide and metallic phases. Heavy metals evidently were distributed among these phases but were not detected by micro-probe analysis due to their low levels of concentration. Table 3 shows the micro-probe analyses of the three phases observed.

TABLE 3

| Phase | Chromium Sulfide | Nickel Sulfide | Metallic |
|---|---|---|---|
| % Cr | 42 | 0.06 | 2.5 |
| % Ni | 8.8 | 70 | 71 |
| % Co | 2.4 | 2.2 | 12 |
| % Fe | 0.5 | 0.1 | 6.2 |
| % Mo | 0.7 | 0.09 | 4.3 |
| % S | 48 | 28.8 | 0.8 |

The low level of sulfur was found to lead to some chromium being present in the metallic phase, a situation regarded as being undesirable due to creation of problems in the leaching circuit, and a somewhat lower level of iron and molybdenum reporting in the chromium sulfide phase.

EXAMPLE 4

A further sulfiding test was carried out on a similar oxidized melt to that of Examples 2 and 3, except that in this case a high sulfur matte was produced by suitably increasing the addition of nickel sulfide and elemental sulfur. The matte was found by chemical analaysis to contain:

Ni: 50.6%
Cr: 9.1%
Fe: 3.1%
Co: 5.8%

Mo: 2.6%
W: 1.0%
Nb: 0.7%
S: 29.4%

On slow-cooling the matte produced a coarse-grained structure which was found to consist almost entirely of nickel sulfide and chromium sulfide phases. A third phase of metallics was present in too small a quantity to analyze reliably by micro-probe, and no separate heavy metal phase was observed. The micro-probe analysis of each of the two sulfide phases is shown in Table 4.

TABLE 4

| Phase | Chromium Sulfide | Nickel Sulfide |
|---|---|---|
| % Cr | 33 | 0.05 |
| % Ni | 10 | 67 |
| % Co | 5 | 2.5 |
| % Fe | 2.7 | 0.2 |
| % Mo | 3.3 | — |
| % S | 41.5 | 28 |

It will be seen that at this high sulfur level a lower Cr:Ni ratio was achieved in the chromium sulfide grains than in Examples 2 and 3 when the mattes contained less-sulfur. It would therefore appear that the sulfur level to aim at is one high enough to ensure total sulfidation of chromium, but not so high as to saturate the matte. In the case of the typical feeds tested, a sulfur content of the order of 25% appears most preferred inasmuch as it maximizes the amount of chromium reporting to the chromium sulfide phase, minimizes the amount of other metals reporting to that phase, and concentrates the heavy metals in a separate phase.

EXAMPLE 5

Some tests have been carried out to investigate the physical separation of the phases in a slow-cooled matte. It should be mentioned that the matte structure was not as coarse grained as might be desired due to the inability to achieve sufficiently slow cooling with the relatively small ingot size used for experimental purposes.

We have used a combination of magnetic separation and classification to separate sulfides from metallic phase. Thus, a 100 g sample of a 23% S slow-cooled matte was subjected to a three stage magnetic separation which produced a 475 g nonmagnetic fraction, and a 524 g magnetic fraction. The latter, after grinding and screening, was divided into 120 g of material finer than 325 mesh and 404 g of coarser material. By analyzing the fractions for sulfur and estimating the sulfide content of each fraction, the chromium distribution between the fractions could be estimated on the basis of our finding that chromium is present only in the $Cr_2S_3$ phase of such a matte. Such a calculation gave the following chromium distribution:

| Fraction | Cr Distribution (%) |
|---|---|
| +325 Magnetic | 4 |
| −325 Magnetic | 14 |
| Nonmagnetic | 82 |

We have also carried out some froth flotation experiments in which a high grade nickel concentrate was separated from the ground matte. A chromium concentrated was obtained which represented 70% of the total amount of chromium present in the matte, and contained approximately equal concentrations of nickel and chromium with little of the other metals present in the matte. Better chromium-nickel separation could no doubt be achieved by optimization of the flotation procedure.

It will be appreciated that while reference has been made repeatedly herein to the separate recovery of chromium from the scrap metals in question, the invention also facilitates the recovery of the nickel, cobalt, copper, etc. from the feedstock. It will also be understood that various modifications and additions may be made to the details of the embodiments of the invention described without departing from the scope of the invention which is defined by the appended claims.

We claim:

1. A process for separating chromium from other constituents of a scrap metal charge, which contains chromium alloyed with at least one metal selected from the group consisting of nickel, cobalt and copper, and may contain lesser amounts of other metals, comprising:
   (i) heating said charge to form a melt thereof;
   (ii) introducing into said melt an oxidant selected from the group consisting of oxygen, oxygen-containing gaseous mixtures and reducible metal oxides, in a predetermined amount efficient to oxidize any reactive metals of the group consisting of aluminum, titanium, silicon, calcium, magnesium, zirconium, hafnium, tantalum and manganese which are present in said melt, and adding fluxing reagent to said melt to form a molten slag containing oxides of said reactive metals;
   (iii) separating said slag from the resulting partly refined melt;
   (iv) introducing into said partly refined melt a sulfiding agent selected from the group consisting of elemental sulfur and metal sulfides, in a predetermined amount effective to ensure sulfidation of substantially all of the chromium present in said melt;
   (v) slow-cooling the sulfided melt at a controlled rate effective to ensure the formation of a coarse-grained matte which consists predominantly of a chromium sulfide;
   (iv) fragmenting said cooled matte to an extent sufficient to liberate the individual phases thereof; and
   (vii) subjecting said fragmented matte to at least one physical separation process to separate chromium sulfide particles from the remainder of said matte.

2. A process in accordance with claim 1 wherein said sulfiding agent is selected from the group consisting of elemental sulfur, nickel sulfide, cobalt sulfide, copper sulfide, and mixtures thereof.

3. A process in accordance with claim 2 wherein the amount of said sulfiding agent introduced is selected to produce a sulfided melt containing at least twice the amount of sulfur stoichiometrically required to sulfide all of the chromium present in said melt.

4. A process in accordance with claim 3 wherein the amount of said sulfiding agent used is such that said sulfided melt contains between about 20 and 30 percent by weight of sulfur.

5. A process in accordance with claim 1 wherein said oxidant used is selected from the group consisting of oxygen, air, and reducible metal oxides.

6. A process in accordance with claim 1 wherein said step of fragmenting comprises comminution to particles not greater than about 75 microns in diameter.

7. A process according to claim 5 wherein the reducible metal oxide is selected from the group consisting of the oxides of iron, nickel, chromium, cobalt, copper, niobium, and molybdenum.

8. A process according to claim 7 wherein the reducible metal oxide is nickel oxide.

9. A process according to claim 8 wherein the reducible metal oxide is chromium oxide.

10. A process according to claim 7 wherein the reducible metal oxide is cobalt oxide.

* * * * *